United States Patent
Deng et al.

(10) Patent No.: US 11,553,452 B2
(45) Date of Patent: Jan. 10, 2023

(54) POSITIONING CONTROL METHOD AND DEVICE, POSITIONING SYSTEM AND STORAGE MEDIUM

(71) Applicant: BOE TECHNOLOGY GROUP CO., LTD., Beijing (CN)

(72) Inventors: Wei Deng, Beijing (CN); Hongtao Guan, Beijing (CN); Baoyu Shi, Beijing (CN); Zhichao Li, Beijing (CN); Yanfu Li, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/281,789

(22) PCT Filed: May 12, 2020

(86) PCT No.: PCT/CN2020/089870
§ 371 (c)(1),
(2) Date: Mar. 31, 2021

(87) PCT Pub. No.: WO2020/259107
PCT Pub. Date: Dec. 30, 2020

(65) Prior Publication Data
US 2021/0400625 A1    Dec. 23, 2021

(30) Foreign Application Priority Data
Jun. 26, 2019 (CN) .................. 201910561597.X

(51) Int. Cl.
*H04W 64/00* (2009.01)

(52) U.S. Cl.
CPC .................. *H04W 64/006* (2013.01)

(58) Field of Classification Search
CPC ..... H04W 16/14; H04W 16/20; H04W 48/18; H04W 28/0231; H04W 48/20;
(Continued)

(56) References Cited

U.S. PATENT DOCUMENTS

| 9,063,212 B2 | 6/2015 | Jones, Jr. et al. |
| 2003/0114195 A1* | 6/2003 | Chitrapu .............. H04W 16/28 455/562.1 |

(Continued)

FOREIGN PATENT DOCUMENTS

| CN | 103298082 A | 9/2013 |
| CN | 104113896 A | 10/2014 |

(Continued)

OTHER PUBLICATIONS

First office action of Chinese application No. 201910561597.X dated Oct. 10, 2020.

(Continued)

*Primary Examiner* — Kwasi Karikari
(74) *Attorney, Agent, or Firm* — Fay Sharpe LLP

(57) ABSTRACT

A positioning control method includes: determining a position of a positioning object; determining, based on the position of the positioning object, at least one target positioning beacon whose distance to the positioning object satisfies a predetermined condition; and sending a prompt message to the target positioning beacon, wherein the prompt message is intended to instruct a positioning beacon to switch a broadcast frequency from a first frequency to a second frequency which is greater than the first frequency.

16 Claims, 6 Drawing Sheets

(58) Field of Classification Search
CPC . H04W 36/14; H04W 36/305; H04W 40/246; H04W 76/11; H04W 28/20; H04W 28/26; H04W 36/0083; H04W 36/06; H04W 36/32; H04W 48/16; H04W 4/027; H04W 60/04; H04W 72/085; H04W 72/10
See application file for complete search history.

(56) References Cited

U.S. PATENT DOCUMENTS

2013/0225197 A1    8/2013  Mcgregor et al.
2017/0367146 A1*  12/2017  Ryoke .................... H04W 88/04
2019/0045407 A1*   2/2019  Logan .................... H04W 36/32
2019/0124664 A1*   4/2019  Wang ................ H04W 72/0486

FOREIGN PATENT DOCUMENTS

| CN | 104144481 A | 11/2014 |
| CN | 104320751 A | 1/2015 |
| CN | 204116597 U | 1/2015 |
| CN | 106291446 A | 1/2017 |
| CN | 107306441 A | 10/2017 |
| CN | 108650634 A | 10/2018 |
| CN | 109699019 A | 4/2019 |
| CN | 110261813 A | 9/2019 |
| CN | 110366114 A | 10/2019 |

OTHER PUBLICATIONS

Second office action of Chinese application No. 201910561597.X dated Jun. 2, 2021.

* cited by examiner

POSITIONING CONTROL METHOD AND DEVICE, POSITIONING SYSTEM AND STORAGE MEDIUM

CROSS-REFERENCE TO RELATED APPLICATIONS

This application is a 371 of PCT Application Serial No. PCT/CN2020/089870, filed on May 12, 2020, which claims priority to Chinese Patent Application No. 201910561597.X, filed on Jun. 26, 2019 and titled "POSITIONING CONTROL METHOD AND APPARATUS, ELECTRONIC DEVICE AND STORAGE MEDIUM," the disclosure of which is herein incorporated by reference in its entirety.

TECHNICAL FIELD

The present disclosure relates to the field of positioning technologies, in particular to a positioning control method and device, a positioning system, and a storage medium.

BACKGROUND

In the field of positioning technologies, for example, in the field of the indoor positioning technology, the life cycle of a positioning beacon exerts a great impact on the hardware update and positioning accuracy of a positioning system. Therefore, reducing the power consumption of the positioning beacon and prolonging the life cycle of the positioning beacon are of great significance to an indoor positioning system.

SUMMARY

The present disclosure is intended to provide a positioning control method and device, a positioning system, and a storage medium.

According to a first aspect of the present disclosure, a positioning control method is provided. The positioning control method includes:

determining a position of a positioning object; determining, based on the position of the positioning object, at least one target positioning beacon whose distance to the positioning object satisfies a predetermined condition; and sending a prompt message to the target positioning beacon, wherein the prompt message is intended to instruct a positioning beacon to switch a broadcast frequency from a first frequency to a second frequency which is greater than the first frequency.

Optionally, determining, based on the position of the positioning object, the at least one target positioning beacon whose distance to the positioning object satisfies the predetermined condition includes: predicting, based on a movement trajectory of the positioning object acquired in advance, the at least one target positioning beacon whose distance to the positioning object satisfies the predetermined condition.

Optionally, the method further includes: generating the movement trajectory of the positioning object based on at least one history position of the positioning object acquired within a first predetermined time period.

Optionally, determining, based on the position of the positioning object, the at least one target positioning beacon whose distance to the positioning object satisfies the predetermined condition includes: determining at least one positioning beacon whose distance to a closest positioning beacon is less than a threshold as the at least one target positioning beacon, wherein the closest positioning beacon is determined to be closest to the positioning object based on the position of the positioning object.

Optionally, sending the prompt message to the target positioning beacon includes: instructing the positioning object to send the prompt message to the target positioning beacon.

Optionally, the method further includes: sending a control message to the positioning object, wherein the control message is intended to instruct the positioning object to shorten a duration of scanning a broadcast message sent by the positioning beacon.

Optionally, determining the position of the positioning object includes: determining the position of the positioning object based on information of at least one positioning beacon detected by the positioning object.

Optionally, the information of the at least one positioning beacon includes at least one unique identification code of the at least one positioning beacon, and the memory stores a corresponding relationship between the unique identification code and position coordinates of the positioning beacon therein; and determining the position of the positioning object based on the information of the at least one positioning beacon detected by the positioning object includes: acquiring position coordinates of at least three positioning beacons from the memory based on the unique identification codes of the at least three positioning beacons detected by the positioning object; and determining the position of the positioning object using a three-point positioning algorithm based on the position coordinates of the at least three positioning beacons.

According to a second aspect of the present disclosure, a positioning control method is provided. The positioning control method includes: sending a broadcast message at a first frequency; acquiring a prompt message, wherein the prompt message is intended to instruct a positioning beacon to switch a broadcast frequency from the first frequency to a second frequency, and the prompt message is generated in response to detecting the positioning object; switching the broadcast frequency from the first frequency to the second frequency based on the prompt message; and sending the broadcast message at the second frequency which is greater than the first frequency.

Optionally, acquiring the prompt message includes: acquiring the prompt message from the positioning object, or acquiring the prompt message broadcast by at least one target positioning beacon, wherein a distance between the at least one target positioning beacon and the positioning object satisfies a predetermined condition.

Optionally, the method further includes: in response to switching the broadcast frequency from the first frequency to the second frequency, switching the broadcast frequency from the second frequency to the first frequency if an instruction message to change the broadcast frequency is not received within a second predetermined time period.

According to a third aspect of the present disclosure, a positioning control device is provided. The positioning control device includes: at least one module. The at least one module may be configured to perform any positioning control method as defined in the first aspect.

According to a fourth aspect of the present disclosure, a positioning control device is provided. The positioning control device includes: at least one module. The at least one module may be configured to perform any positioning control method as defined in the second aspect.

According to a fifth aspect of the present disclosure, a positioning control device is provided. The positioning control device includes a memory, a processor, and a computer program stored in the memory and runnable on the processor, wherein the processor, when running the program, is caused to perform the positioning control method as defined in the first aspect of the present disclosure.

According to a sixth aspect of the present disclosure, a positioning control device is provided. The positioning control device includes a memory, a processor, and a computer program stored in the memory and runnable on the processor, wherein the processor, when running the program, is caused to perform the positioning control method as defined in the second aspect of the present disclosure.

According to a seventh aspect of the present disclosure, a non-transitory computer-readable storage medium is provided. The non-transitory computer-readable storage medium is configured to store at least one computer instruction therein, wherein the at least one computer instruction, when executed by a computer, causes the computer to perform any of the above positioning control methods as defined in the first aspect and the second aspect.

According to an eighth aspect of the present disclosure, a positioning system is provided. The positioning system includes a plurality of positioning beacons and a positioning control device, wherein the positioning control device and the positioning beacons satisfy at least one of the following conditions: the positioning control device includes the positioning control device as defined in the third aspect, and the positioning beacons include the positioning control device as defined in the fourth aspect.

According to a ninth aspect of the present disclosure, a positioning system is provided. The positioning system includes: a plurality of positioning beacons and a positioning control device, wherein the positioning control device and the positioning beacons satisfy at least one of the following conditions: the positioning control device includes the positioning control device as defined in the fifth aspect, and the positioning beacons includes the positioning control device as defined in the sixth aspect.

According to a tenth aspect of the present disclosure, the present disclosure provides a computer program product. The computer program product includes at least one computer instruction, which is stored in a computer-readable storage medium. A processor of a computer device may read the at least one computer instruction from the computer-readable storage medium. The computer device, when executing the at least one computer instruction run by the processor, is caused to perform the positioning control method as defined in the first aspect.

According to an eleventh aspect of the present disclosure, the present disclosure provides a computer program product. The computer program product includes at least one computer instruction, which is stored in a computer-readable storage medium. A processor of a computer device may read the at least one computer instruction from the computer-readable storage medium. The computer device, when executing the at least one computer instruction, is caused to perform the positioning control method as defined in the second aspect.

According to a twelfth aspect of the present disclosure, a chip is provided. The chip may include a programmable logic circuit and/or at least one program instruction. The chip is, when in operation, configured to perform the positioning control method as defined in the first aspect.

According to a thirteenth aspect of the present disclosure, a chip is provided. The chip may include a programmable logic circuit and/or at least one program instruction. The chip is, when in operation, configured to perform the positioning control method as defined in the second aspect.

BRIEF DESCRIPTION OF THE DRAWINGS

For clearer descriptions of the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes the present disclosure in detail in conjunction with specific embodiments and the accompanying drawings to make the objects, the technical solutions, and the principles of the present disclosure clearer.

It should be noted that all the terms "first" and "second" in the embodiments of the present disclosure are used herein to distinguish two different entities that have the same name or different parameters. It can be seen that the terms "first" and "second" are only for convenience of description, but shall not be understood as limiting the embodiments of the present disclosure, which are not described repeatedly in subsequent embodiments.

Figure 1:
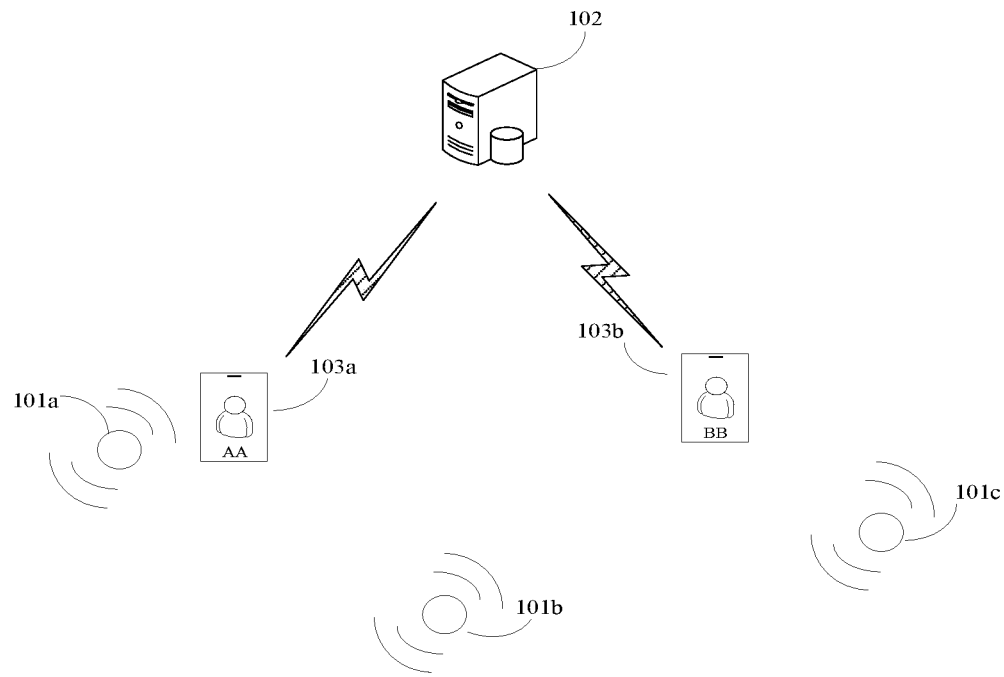
FIG. 1 is a schematic diagram showing an application scenario of a positioning system corresponding to a positioning control method according to an exemplary embodiment.

FIG. 1 is a schematic diagram showing an application scenario of a positioning system corresponding to a positioning control method according to an exemplary embodiment. Referring to FIG. 1, the positioning system involved in this application scenario includes a plurality of positioning beacons (positioning beacons 101a to 101c schematically represent the plurality of positioning beacons in FIG.

1), a positioning control device 102, and one or more mobile devices (mobile devices 103a and 103b schematically represent the one or more mobile devices in FIG. 1). The positioning system involved in this application scenario may be deployed in various areas such as a shopping mall, a supermarket, an office building, a factory, a storage warehouse, or a parking lot. A positioning object may be accurately positioned by using the positioning system, such that required actions can be performed based on the determined position, such as pushing specific information (such as advertisements) to the positioning object; or recording a movement trajectory of the positioning object to prevent the positioning object from entering areas not allowed to enter; or providing a guidance for workers to patrol a production line in a factory so as to prevent the workers from deviating a predetermined patrol path, etc.

A positioning beacon in an embodiment of the present disclosure may be, for example, a beacon with a Bluetooth function, and preferably a Bluetooth beacon with low power consumption. A plurality of positioning beacons may be deployed at specified positions in the applied scenario to send broadcast messages. The plurality of positioning beacons are configured to position the positioning object in the positioning system.

For example, each mobile device may be equipped with a module that can acquire information of the positioning beacons. For example, the mobile device is equipped with a Bluetooth chip or an electronic tag capable of acquiring a received signal strength indication (RSSI) value of the positioning beacon, or equipped with a module capable of acquiring an identification of the positioning beacon, for example, an antenna capable of receiving a broadcast message sent by the positioning beacon.

Optionally, the communication module may also send a message (such as a prompt message in the subsequent embodiments) to the positioning beacon. In the positioning system, the mobile device with the aforementioned communication module is determined as the positioning object. FIG. 1 gives schematic illustration by taking a mobile device being equipped with a Bluetooth chip as an example. The positioning control device 102 may be a server or a server cluster or a cloud computing center. The positioning control device 102 is in communication with the mobile device (i.e., the positioning object) equipped with the Bluetooth chip. The positioning control device 102 is configured to control, based on the position of the positioning object, a broadcast frequency at which a positioning beacon sends a broadcast message.

In the embodiment of the present application, the communication connection between the positioning control device 102 and the mobile device may be established in a plurality of ways, for example, by a wireless local area network, such as wireless fidelity (Wi-Fi) or ZigBee protocol network; or established by mobile communication networks of various generations (2G, 3G, 4G, and 5G).

Figure 2:
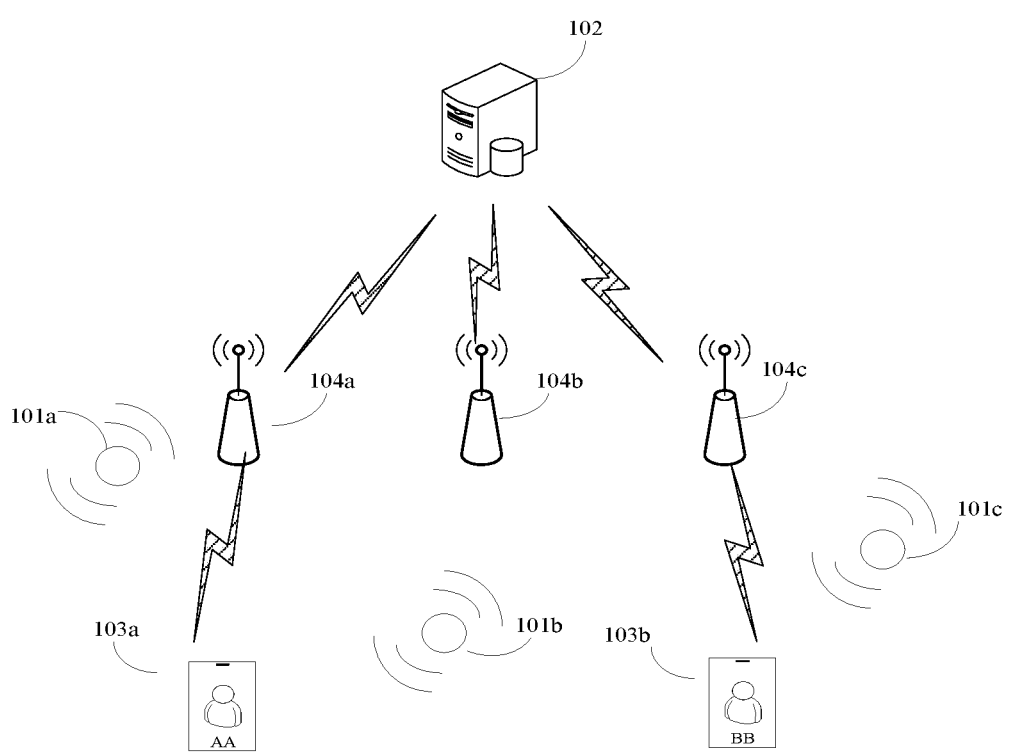
FIG. 2 is a schematic diagram showing an application scenario of a positioning system corresponding to a positioning control method according to another exemplary embodiment.

Optionally, as shown in FIG. 2, it is assumed that the positioning control device 102 has established a communication connection with the mobile device by a wireless local area network, then the positioning system may further include: one or more gateways (in FIG. 2, gateways 104a to 104c schematically represent the one or more gateways). The gateway may be a router or the like. In the positioning system, the positioning control device 102 is in communication with each mobile device by one of the one or more gateways.

In related arts, a global positioning system (GPS), Galileo positioning system or Beidou positioning system is usually used to provide a positioning service. However, due to poor penetrability, radio waves cannot penetrate buildings or exterior walls of buildings. Thus, the radio waves cannot be normally used indoors or when they are blocked by buildings. In addition, long-term running of GPS services upon activation consumes more power. Moreover, the accuracy of other positioning services based on cellular networks such as Wi-Fi, general packet radio service (GPRS), or the like, is also greatly restricted indoors.

However, in the embodiment of the present disclosure, an indoor positioning object is positioned by using positioning beacons, wherein broadcast messages may be sent by using a plurality of indoor positioning beacons, and the positioning object sends information of the detected positioning beacons, such as signal strength information, to the positioning control device 102, and the positioning control device 102 accurately determines the indoor position of the positioning object by performing multi-point positioning based on the received information. The cost of the positioning method is low. At present, the life cycle of the positioning beacon can be prolonged by charging the positioning beacon.

Figure 3:
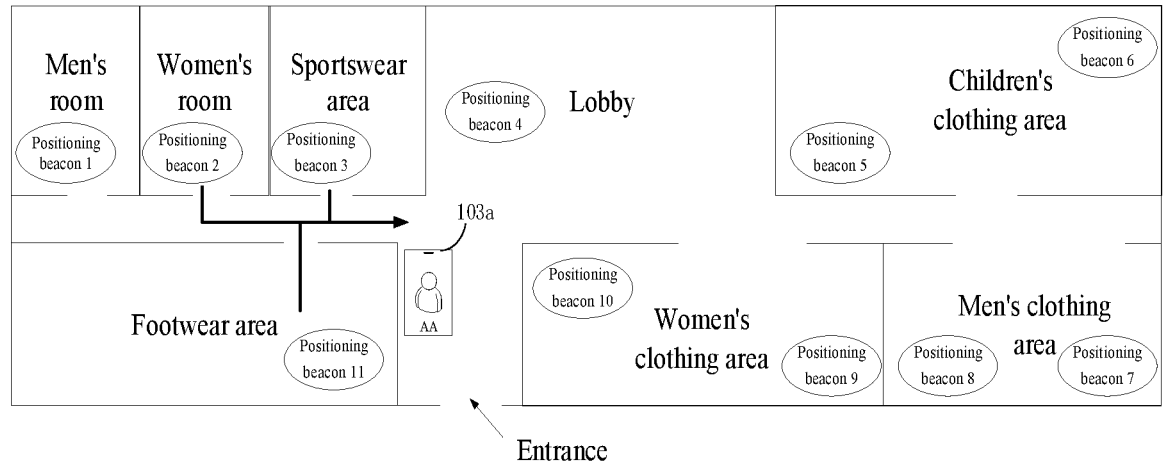
FIG. 3 is a schematic plan diagram of a positioning system deployed in a shopping mall as involved in a positioning control method according to an exemplary embodiment.

For ease of understanding, in the embodiment of the present application, the positioning principle is described by taking the case where the positioning system is deployed in a shopping mall as an example. FIG. 3 is a schematic plan diagram of a positioning system deployed in a shopping mall as involved in a positioning control method according to an exemplary embodiment of the present disclosure. It is assumed that the positioning system is deployed with 11 positioning beacons, namely the positioning beacon 1 to the positioning beacon 11. If a positioning object 103a passes by the positioning beacon 2, the positioning beacon 3, and the positioning beacon 11 in sequence during the movement, broadcast messages sent by the positioning beacon 2, the positioning beacon 3 and the positioning beacon 11 and signal strength information of the broadcast messages may be detected in sequence. Then the positioning object 103a sends the information of the detected positioning beacons to a positioning control device (not drawn in FIG. 3), and the positioning control device determines a precise position of the positioning object by means of multi-point positioning. In some embodiments, in response to determining the precise position of the positioning object, the positioning beacons around the positioning object, such as the positioning beacons 3, 4, and 11, may broadcast specific information (such as advertisements) to the positioning object. For example, the positioning beacon 3 located in a sportswear area may broadcast a broadcast message carrying sportswear advertisements to the positioning object; the positioning beacon 11 located in a footwear area may broadcast a broadcast message carrying footwear advertisements to the positioning object; and the positioning beacon 4 located in a lobby may broadcast a broadcast message carrying a shopping mall guide map to the positioning object.

Figure 4:
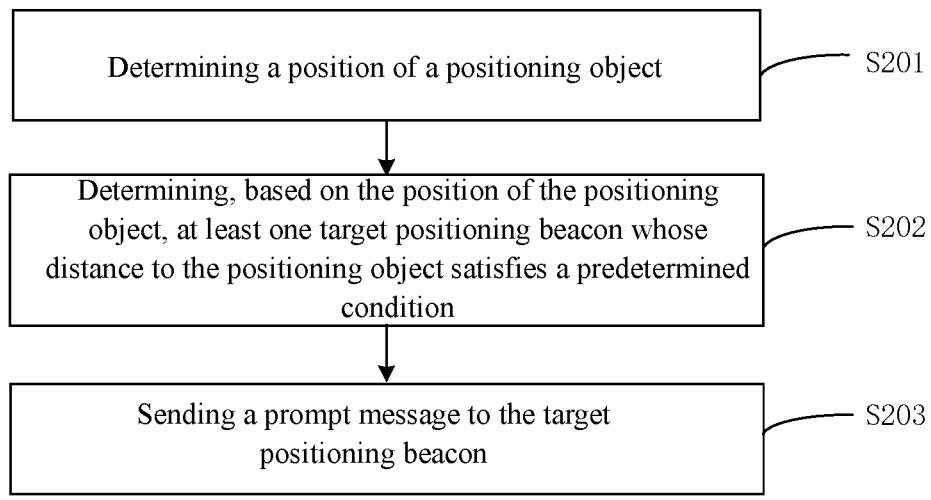
FIG. 4 is a flowchart of a positioning control method according to an exemplary embodiment.

FIG. 4 is a flowchart of a positioning control method according to an exemplary embodiment. The method may be performed by the positioning control device, or may be performed by the positioning object. The following embodiment is described by taking the method being performed by the positioning control device as an example. For the processes for performing the positioning control method by the positioning object, reference may be made to the corresponding processes of the positioning control device. As shown in FIG. 4, the method includes the following processes.

In S201, a position of the positioning object is determined.

In the embodiment of the present disclosure, the positioning control device may determine the position of the positioning object in various ways. In a first optional way, the positioning object itself has a positioning function, such that the positioning object may determine its own position and send the position to the positioning control device. For example, the positioning object may be positioned by GPS, Galileo positioning system or Beidou positioning system, or be positioned based on a cellular network, such as WIFI or GPRS, etc. However, due to low positioning accuracy of these positioning systems indoors, if the position of the positioning object is determined by using this optional way, the process S201 can be considered a rough positioning process of the positioning object.

Figure 5:
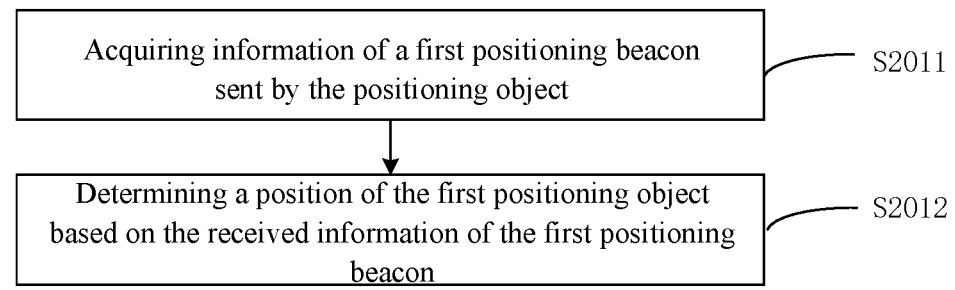
FIG. 5 is a flowchart of a method for determining a positioning object according to an exemplary embodiment.

In a second optional way, the positioning control device performs positioning based on positioning beacons. Since the accuracy of positioning by positioning beacons indoors is relatively high, if the position of the positioning object is determined by using this optional way, the process S201 can be considered an accurate positioning process of the positioning object. For example, the position of the positioning object can be determined based on information of positioning beacons detected by the positioning object. As shown in FIG. 5, determining the position of the positioning object includes the following sub-processes.

In S2011, information of a first positioning beacon sent by the positioning object is acquired.

The information of the first positioning beacon is determined by the positioning object based on a broadcast message, which is acquired by scanning from first positioning beacon.

For example, when the positioning object enters or is in an area disposed positioning beacons, the broadcast message broadcast by the first positioning beacon which is closer to the positioning object (for example, within a scanning range of the positioning object) within the area may be acquired by scanning, wherein the broadcast message may at least include a unique identification code of the positioning beacon. The unique identification code of the positioning beacon may be a media access control address (MAC) of the positioning beacon, or a character string used to identify the positioning beacon, or the like.

As described above, the information of the first positioning beacon is determined by the positioning object based on the broadcast message, which is acquired by scanning from the first positioning beacon. For example, the information of the first positioning beacon includes at least one of signal strength information of the first positioning beacon and the unique identification code of the first positioning beacon. For example, the signal strength information includes RSSI.

Since the broadcast message carries the unique identification code of the positioning beacon, the positioning object may directly extract this unique identification code.

The positioning object may determine the signal strength information of the first positioning beacon in many ways. In an exemplary embodiment, the positioning object may determine the signal strength information of the first positioning beacon based on a signal strength of the scanned broadcast message. Then, the signal strength information includes at least information indicative of the signal strength of the scanned broadcast message, such as the aforementioned RSSI.

In an example, the first positioning beacon may be a positioning beacon set, which may include at least three positioning beacons (positioning may be practiced using a three-point positioning algorithm based on coordinates of the positioning beacons). For example, the positioning beacon set may include at least three positioning beacons disposed at different positions.

In an optional way, a plurality of positioning beacons may be scanned by the positioning object, and the first positioning beacon (i.e., the positioning beacon set) can be acquired by filtering the plurality of positioning beacons. For example, the first n positioning beacons with relatively high signal strength are selected as the first positioning beacons, wherein n is a predetermined number of first positioning beacons, for example, n≥3. In another optional way, a plurality of positioning beacons may be scanned by the positioning object, and the plurality of positioning beacons are directly determined as the first positioning beacon.

In S2012, the position of the positioning object is determined based on the received information of the first positioning beacon.

This process includes the following sub-processes.

In A1, the positions of the first positioning beacons are determined based on the information of the first positioning beacons.

In an exemplary embodiment, a corresponding relationship between the information of each positioning beacon and the position of the positioning beacon may be pre-stored in the positioning control device (for example, in a memory). For example, a corresponding relationship between a unique identification code (for example, a MAC address) of each positioning beacon and position coordinates of the positioning beacon may be pre-stored in the positioning control device. Therefore, after acquiring the unique identification code of each positioning beacon, the positioning control device may generally acquire the position coordinates of the positioning beacon by querying the corresponding relationship, wherein the position coordinates of the positioning beacon are intended to indicate the position of the positioning beacon.

In A2, the position of the positioning object is determined based on the positions of the first positioning beacons.

Optionally, the positioning control device may determine the position of the positioning object using a three-point positioning algorithm based on the positions of the first positioning beacons.

For example, after the signal strength information (such as RSSI values) of the first positioning beacons (e.g., at least three positioning beacons) is acquired in S2011, three of the first positioning beacons may be selected. A distance between the positioning object and each of the three positioning beacons is determined based on the signal strength information of the three positioning beacons. The position of the positioning object is then determined using a three-point positioning algorithm based on the distances between the positioning object and the three positioning beacons, and the positions of the three positioning beacons (for example, expressed by position coordinates). For example, in a coordinate system where the three positioning beacons are deployed (such as an earth coordinate system, or other designated coordinate systems), the positions of the three positioning beacons are taken as points, and a circle is then drawn with a distance between each point (i.e., the positioning beacon corresponding to this point) and the positioning object as a radius, and then the position of the positioning object is acquired by calculating an intersection of the acquired three circles.

Still for example, after the signal strength information of the first positioning beacons (for example, at least three positioning beacons) is acquired in S2011, if the number of acquired positioning beacons is greater than 3, the distance between the positioning object and each positioning beacon may be determined based on the acquired signal strength information of at least three positioning beacons. For every three positioning beacons of the at least three positioning beacons, the position of the positioning object is determined using a three-point positioning algorithm based on a distance between the positioning object and each of the three positioning beacons, and positions of the three positioning beacons. Finally, an average position of the positions of the positioning object respectively determined by every three positioning beacons may be determined as the final position of the positioning object. In this way, the accuracy of the determined position of the positioning object can be improved.

For example, it is assumed that a total of 4 positioning beacons from 1 to 4 are acquired, then a position 1 of the positioning object may be determined using a three-point positioning algorithm based on a distance between the positioning object and each of the positioning beacons 1 to 3, and positions of the positioning beacons 1 to 3; a position 2 of the positioning object may be determined using the three-point positioning algorithm based on a distance between the positioning object and each of the positioning beacons 1, 2 and 4, and positions of the positioning beacons 1, 2 and 4; a position 3 of the positioning object may be determined using the three-point positioning algorithm based on a distance between the positioning object and each of the positioning beacons 1, 3 and 4, and positions of the positioning beacons 1, 3 and 4; and a position 4 of the positioning object may be determined using the three-point positioning algorithm based on a distance between the positioning object and each of the positioning beacons 2, 3, and 4, and positions of the positioning beacons 2, 3 and 4. Finally, an average position of the positions 1 to 4 of the positioning object may be determined as the final position of the positioning object.

Optionally, the positioning control device may determine the position of the positioning object in other ways based on the positions of the first positioning beacons. For example, after the signal strength information (such as RSSI values) of the first positioning beacons (for example, at least three positioning beacons) is acquired in S2011, first m positioning beacons with relatively high signal strength may be selected from at least three positioning beacons, wherein m≥3; a minimum circumscribed circle that includes the m positioning beacons is determined based on the acquired positions of the m positioning beacons; and the circumcenter of the minimum circumscribed circle is then determined as the position of the positioning object.

In S202, at least one target positioning beacon whose distance to the positioning object satisfies a predetermined condition is determined based on the position of the positioning object.

Figure 6:
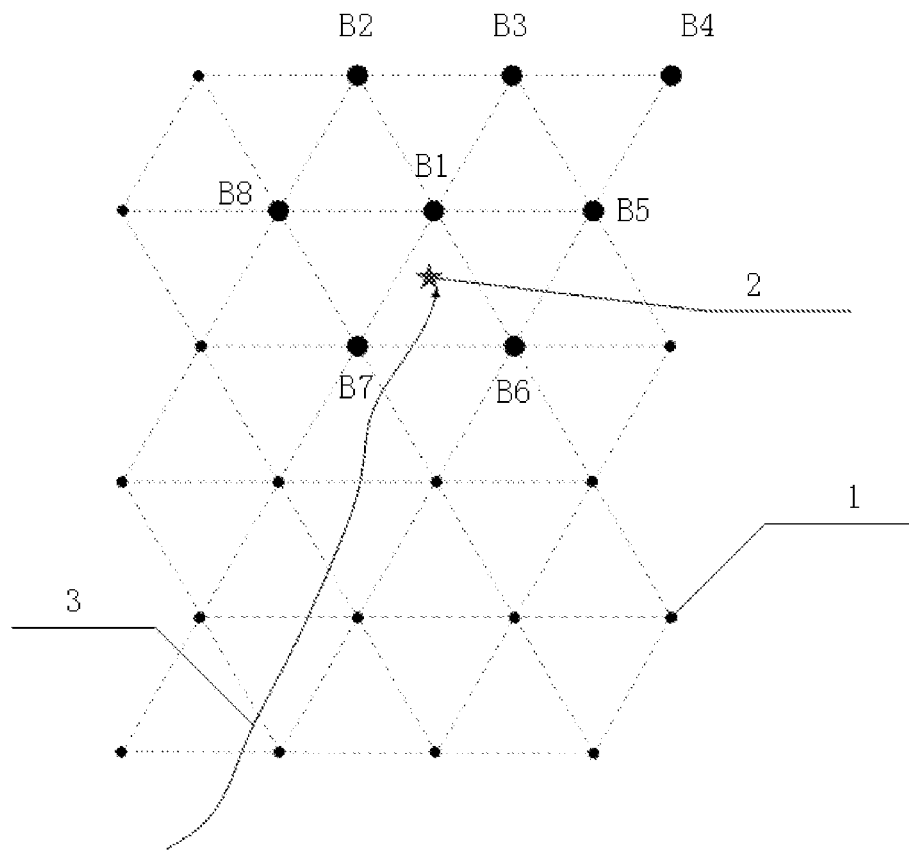
FIG. 6 is a schematic diagram showing a movement trajectory of a positioning object according to an exemplary embodiment.

In an example, as shown in FIG. 6, the at least one target positioning beacon whose distance to the positioning object satisfies the predetermined condition, for example, may be a positioning beacon B1 which is closest to the positioning object within an area where the positioning object is currently located. Alternatively, the at least one target positioning beacon may also include positioning beacons B2 to B8 whose distances to a positioning beacon that is closest to the positioning object are less than a predetermined distance.

It should be noted that in S201, the positioning object may scan a plurality of positioning beacons, and send information of the plurality of positioning beacons to the positioning control device. If the information of the plurality of positioning beacons is processed to determine the target positioning beacons whose distance satisfies the predetermined condition, a large calculation overhead is caused and the calculation efficiency is also affected. Therefore, before S202, the positioning control device may filter the received information of the plurality of positioning beacons to reduce the number of determined target positioning beacons whose distances satisfy the predetermined condition. For example, the first k positioning beacons with relatively high signal strength are selected from the acquired plurality of positioning beacons as candidate positioning beacons. This process may be referred to as a beacon selection process, and k is a predetermined number of the candidate positioning beacons, for example, k≥3. The target positioning beacon determined in S202 is a candidate positioning beacon.

In S203, a prompt message is sent to the target positioning beacon.

For example, the positioning control device may instruct the positioning object to send a prompt message to the target positioning beacon. The prompt message is intended to instruct a positioning beacon to switch a broadcast frequency from a first frequency to a second frequency which is greater than the first frequency.

The first frequency may be a broadcast frequency of the positioning beacon when the positioning beacon is in low power consumption, and the second frequency may be a broadcast frequency of the positioning beacon required when the positioning beacon is used for positioning. A value range of the second frequency needs to be determined based on the requirements of each positioning response speed. In general, a broadcast interval may be 500 ms, and the corresponding frequency may be 2 Hz. A value range of the first frequency may be determined based on the system power consumption requirements and/or a moving speed of the positioning object. The lower the required power consumption is, the smaller the value of the first frequency is. However, in order not to affect the positioning, when the positioning object moves to the next positioning area, it is necessary that the at least one target positioning beacon has received the prompt message and increased the broadcast frequency to the second frequency.

In the embodiment of the present application, the prompt message may be sent to the target positioning beacon in a plurality of ways. As shown in FIG. 6, if the above-mentioned target positioning beacon is B1, the positioning object may be instructed to send the prompt message to B1 to control B1 to broadcast the prompt message, such that positioning beacons around B1 (such as positioning beacons B2 to B8) may acquire the prompt message by means of scanning; if the aforementioned at least one target positioning beacon includes positioning beacons B1 to B8, the positioning object may be instructed to send the prompt message to the positioning beacons B1 to B8, or the positioning object is still instructed to send the prompt message to the positioning beacon B1, such that B1 broadcasts the prompt message, and the positioning beacons B2 to B8 may acquire the prompt message by means of scanning. In response to acknowledging that the positioning object has been detected currently from the prompt message, the positioning beacons B1 to B8 may switch their broadcasting frequencies from the first frequency to the second frequency.

Optionally, the prompt message may be generated by the positioning control device, wherein the prompt message may carry at least one unique identification code of the at least one positioning beacon (that is, the at least one target positioning beacon) that needs to receive the prompt message. In this way, in the process of sending the prompt message to the target positioning beacon, each positioning beacon that receives the prompt message may determine whether it is the target positioning beacon, and then switch its broadcast frequency from the first frequency to the second frequency if the positioning beacon is the target positioning beacon.

According to the positioning control method in the embodiment of the present disclosure, after the positioning object is positioned, the prompt message is sent to the target positioning beacon whose positioning distance satisfies the predetermined condition, such that the target positioning beacon increases its broadcast frequency. However, before the positioning object is detected (that is, before the frequency switching is performed), a relatively low broadcast frequency may be used, which can reduce the power consumption of the positioning beacon during the positioning process and prolong the life cycle of the positioning beacon. In addition, by increasing the broadcast frequency of the positioning beacon based on the prompt message, the positioning response time can be shortened, and the positioning response efficiency can be improved.

Optionally, in S201, if the positioning object is positioned by using the first optional way, the accuracy of the position of the acquired positioning object is relatively low; and if the positioning object is positioned by using the second optional way, the accuracy is improved to some extent, but the low broadcast frequency of the positioning beacon still affects the positioning accuracy. Therefore, after the target positioning beacon switches to the second frequency from the first frequency, positioning can be performed again based on the positioning beacons. That is, the second optional way in S201 is executed again to acquire a more accurate position of the positioning object.

S202 may be performed in a plurality of ways. The embodiment of the present disclosure is described by taking the following implementations as examples.

In some embodiments, the process of determining, based on the position of the positioning object, the at least one target positioning beacon whose distance to the positioning object satisfies the predetermined condition may include: predicting, based on a movement trajectory of the positioning object acquired in advance, the at least one target positioning beacon whose distance to the positioning object satisfies the predetermined condition.

When the positioning object moves in the positioning system, travel of the positioning object generates a specific trajectory, such that when the positioning object moves between positioning beacons, a correlation is present between the front and back positioning beacons. The movement trajectory of the positioning object reflects, to some extent, the pattern of the positioning object moving in the positioning system and the correlation between the positioning beacons. Therefore, the accuracy of the determined target positioning beacon and the flexibility of the determining process can be improved by predicting the target positioning beacon by using the motion trajectory of the positioning object.

The process of generating the movement trajectory of the positioning object includes: generating the movement trajectory of the positioning object based on at least one history position of the positioning object acquired within a first predetermined time period. The movement trajectory may be shown in FIG. 6, wherein B1 to B8 are positioning beacons around the positioning object; the reference number 1 in FIG. 6 is used to indicate the positioning beacon; a larger dot corresponding to a positioning beacon in FIG. 6 indicates that the signal strength of the positioning beacon is relatively high, and a smaller dot corresponding to a beacon indicates that the signal strength of the positioning beacon is relatively low; the reference number 2 indicates the positioning object; the reference number 3 indicates the movement trajectory of the positioning object 2; and the star in FIG. 6 indicates the current position of the positioning object 2.

In an exemplary embodiment, the process of predicting the target positioning beacon includes: predicting, based on the movement trajectory, the at least one target positioning beacon whose distance to the positioning object satisfies the predetermined condition. For example, a movement trend of the positioning object may be determined based on the movement trajectory of the positioning object, so as to determine a movement direction of the positioning object based on the movement trend of the positioning object. The current position of the positioning object is then determined based on an average movement speed of the positioning object. The target positioning beacon whose distance to the positioning object satisfies the predetermined condition is determined based on the current position of the positioning object. Alternatively, a positioning beacon that the positioning object is about to pass by may be inferred based on the movement trajectory of the positioning object. For example, as shown in FIG. 6, the positioning object 2 is about to pass by the positioning beacons B1, B2, B3, B4, B5, and B8, and the inferred positioning beacons that the positioning object is about to pass by are determined as the target positioning beacons. In the example shown in FIG. 6, B1, B2, B3, B4, B5, and B8 are target positioning beacons. In regard of this, before the positioning object reaches the target positioning beacons, the target positioning beacons may be controlled to adjust their broadcast frequencies, thereby improving the response efficiency of the positioning beacons.

It should be noted that the aforementioned movement trajectory may be determined based on an artificial intelligence algorithm. The process of predicting, based on the movement trajectory of the positioning object acquired in advance, the at least one target positioning beacon whose distance to the positioning object satisfies the predetermined condition may also be performed based on an Artificial Intelligence algorithm.

In some embodiments, the process of determining, based on the position of the positioning object, the at least one target positioning beacon whose distance to the positioning object satisfies the predetermined condition, may include: determining a positioning beacon that is closest to the positioning object based on the position of the positioning object, and assuming this positioning beacon as a third positioning beacon; and determining at least one positioning beacon whose distance to the third positioning beacon is less than a threshold as the target positioning beacon. For example, the positioning object scans broadcast messages of beacons around the positioning object and uploads positioning information acquired from the broadcast messages to the positioning control device. The positioning control device may select three positioning beacons with the highest signal strength (such as the largest RSSI values) from the acquired positioning beacons, and calculate a distance d between the positioning object and each of the positioning beacons according to Formula (1).

$$d = 10^{-\frac{(RSSI-A)}{10 \times n}}. \tag{1}$$

In the above formula (1), A is a signal strength (in dB) when a transmitter (for example, the positioning beacon) and a receiver (for example, the positioning object) are spaced apart by 1 m, and n refers to an environmental attenuation factor.

Position coordinates of the corresponding positioning beacon are read from the memory based on the unique identification code, such as a MAC address, of the positioning beacon (a corresponding relationship between the MAC address and the position coordinates of the positioning beacon may be pre-stored in the positioning control device). The position P(x, y) of the positioning object is calculated using a three-point positioning algorithm, and is then stored in the memory, and a trajectory of the positioning object may also be formed based on this position. A distance PBn between the positioning object and each beacon is calculated based on the position of the positioning object and coordinates Bn (xn, yn) of each beacon.

$$PBn = \sqrt{(x-x_n)^2 + (y-y_n)^2} \qquad (2)$$

The beacon having the smallest value is selected as B1, i.e., the beacon that is closest to the positioning object, based on the calculated result in Formula (2). Other positioning beacons whose distance to the positioning object satisfies the predetermined condition are then determined. For example, beacons whose distances to the positioning beacon B1 are less than a threshold are determined as the positioning beacons whose distance to the positioning object satisfies the predetermined condition.

In some embodiments, the positioning control method according to the embodiment of the present disclosure may further include: sending a control message to the positioning object after the positioning object is instructed to send the prompt message to the target positioning beacon, wherein the control message is intended to instruct the positioning object to shorten a duration of scanning a broadcast message sent by the positioning beacon. For example, when the positioning object is positioned for the first time within an area managed by the current positioning system, a broadcast frequency of each positioning beacon whose distance to the positioning object satisfies the predetermined condition within the area is increased. Correspondingly, the power consumption of the positioning object can be reduced by appropriately shortening the scanning time. Therefore, the positioning control device may send the control message to the positioning object to control the positioning object to shorten the scanning time. After receiving this control message, the positioning object may shorten its scanning time based on the control message.

In summary, according to the positioning control method in the embodiment of the present disclosure, after the positioning object is positioned, the prompt message is sent to the target positioning beacon whose positioning distance satisfies the predetermined condition, such that the target positioning beacon increases its broadcast frequency, thereby shortening the positioning response time and improving the positioning response efficiency. However, before the positioning object is detected (that is, before the frequency switching), a relatively low broadcast frequency may be used for the positioning beacon, which can reduce the power consumption of the positioning beacons during the positioning process and prolong the life cycle of the positioning beacon. In this way, the power consumption of the entire positioning system can be reduced, and the life cycle of the positioning beacon in the positioning system can be prolonged. Further, according to the positioning control method according to the embodiment of the present disclosure, the power consumption of the positioning beacon may be saved without adding any additional hardware (such as a charging device) to the positioning beacon, thereby reducing the manufacturing cost and the use cost of the positioning beacon. In addition, the power consumption of the positioning object may also be reduced by appropriately shortening the scanning time.

Figure 7:
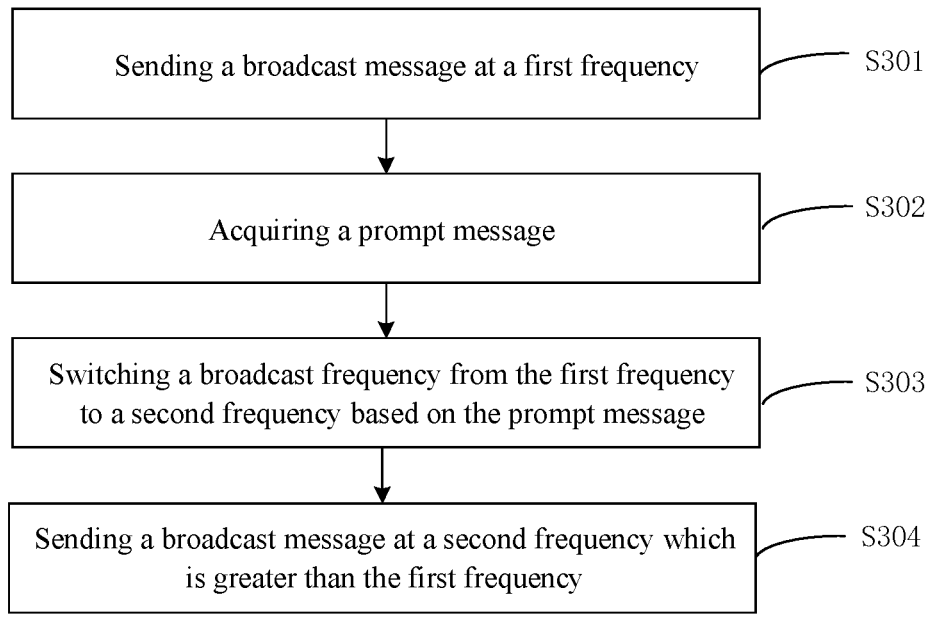
FIG. 7 is a flowchart of a positioning control method according to an exemplary embodiment.

FIG. 7 is a flowchart of a positioning control method according to an exemplary embodiment. The method may be performed by, for example, a positioning beacon. It is assumed that this positioning beacon is a second positioning beacon, then the second positioning beacon may be one of the target positioning beacons in the foregoing embodiment. As shown in FIG. 7, the method includes the following processes.

In S301, a broadcast message is sent at a first frequency.

The broadcast message includes information of the positioning beacon, wherein the information of the positioning beacon may include, for example, a unique identification code of the positioning beacon. The unique identification code may be, for example, a MAC address of the positioning beacon.

In S302, a prompt message is acquired.

The prompt message is intended to instruct a positioning beacon to switch a broadcast frequency from the first frequency to a second frequency, and the prompt message is generated in response to detecting the positioning object. For example, the prompt message may be generated by a positioning control device or by the positioning object. Optionally, the prompt message also indicates that the positioning object is detected.

The prompt message may be acquired in a plurality of ways. For example, the prompt message may be acquired from the positioning object. In this case, the second positioning beacon may be considered as the positioning beacon that is closest to the positioning object within an area where the positioning object is located. After receiving the prompt message, the second positioning beacon may broadcast the prompt message. For example, the prompt message may be broadcast at the first frequency. Alternatively, after the second positioning beacon switches its broadcasting frequency to the second frequency, the prompt message may be broadcast at the second frequency.

For example, the prompt message may also be acquired from other target positioning beacons, wherein the other target positioning beacons may be any of the positioning beacons whose distances to the positioning object satisfy the predetermined condition. Optionally, the other target positioning beacons are different from the second positioning beacon. In some embodiments, the prompt message may be acquired from a third positioning beacon, wherein the third positioning beacon may be determined as the positioning beacon that is closest to the positioning object within the area where the positioning object is located. However, in this case, the second target positioning beacon may be any one of the positioning beacons whose distances to the positioning object satisfy the predetermined condition.

In S303, the broadcast frequency is switched from the first frequency to the second frequency based on the prompt message.

In S304, the broadcast message is sent at the second frequency which is greater than the first frequency.

For example, in the case where the second positioning beacon is the positioning beacon that is closest to the positioning object, in S304, the prompt message may also be sent at the second frequency at the same time, such that other positioning beacons within the area where the positioning object is located (for example, the target positioning beacons whose distances to the positioning object satisfy the predetermined condition) may acquire this prompt message, and thus switch their broadcast frequencies from the first frequency to the second frequency based on this prompt message.

According to the positioning control method of the embodiment of the present disclosure, a broadcast message may be sent at a certain frequency before the prompt message that the positioning object is detected is acquired, and after the prompt message is acquired, the broadcast frequency is increased, such that the broadcast message may be sent at a lower frequency before the positioning object is detected. After the positioning object is detected, the broadcast message is sent at a higher frequency. Therefore, before the positioning object is detected, the power consumption of the positioning beacons during the positioning process is reduced, and the life cycle of the positioning beacons is prolonged. In addition, by increasing the broadcast frequencies of the positioning beacons based on the prompt message, the positioning response time can be shortened, and the positioning response efficiency can be improved.

In some embodiments, the process of acquiring the prompt message may include: acquiring the prompt message from the positioning object, or acquiring the prompt message broadcast by a target positioning beacon, wherein the target positioning beacon is a positioning beacon whose distance to the positioning object within the area where the positioning object is located satisfies the predetermined condition. For example, the prompt message may be acquired from the third positioning beacon, wherein the third positioning beacon may be determined as the positioning beacon that is closest to the positioning object within the area where the positioning object is located. For example, when the second positioning beacon is the positioning beacon that is closest to the positioning object within the area where the positioning object is located, the prompt message may be acquired from the second positioning object. However, when the second positioning beacon is not the positioning beacon that is closest to the positioning object within the area where the positioning object is located, the prompt message broadcast by the third positioning beacon may be acquired. In this case, the third positioning beacon may be determined as the positioning beacon that is closest to the positioning object within the area where the positioning object is located.

In some embodiments, the positioning control method may further include: in response to switching the broadcast frequency from the first frequency to the second frequency, switching the broadcast frequency from the second frequency to the first frequency if an instruction message to change the broadcast frequency is not received within a second predetermined time period. In this way, the positioning beacon is maintained in a low power consumption state. For example, a beacon may be set to automatically reduce a high-frequency broadcast to a low-frequency broadcast if the beacon does not receive control information of the broadcast frequency within a time T.

In some embodiments, the broadcasting frequencies of a plurality of positioning beacons within the same area may be different. For example, within an area where a positioning system is located, a broadcast frequency of a positioning beacon at the edge of this area may be set to a third frequency, and the broadcast frequencies of positioning beacons in other parts of the area are set to a fourth frequency. The third frequency is greater than the fourth frequency (the fourth frequency may be, for example, the same as the aforementioned first frequency). For example, a broadcast frequency of a positioning beacon at an entrance of this area may be set to the third frequency, and the broadcast frequencies of positioning beacons in other parts within this area are set to the fourth frequency. In this way, the response efficiency of the positioning system may be improved. The third frequency is determined based on the requirement for a response speed of entering the positioning system. The higher the third frequency is, the shorter the scanning time is, and the shorter the response time of the positioning system is.

The positioning control method according to the embodiment of the present application has been described as above from the positioning control device side and the positioning beacon side respectively. The following describes the positioning control method according to an embodiment of the present disclosure by using an example from the perspective of the information interaction between different terminal devices in the positioning control method. In this example, the positioning control method may involve positioning beacons, a target positioning item (an example of the above positioning object), a gateway, a positioning control device, and the like.

Figure 8:
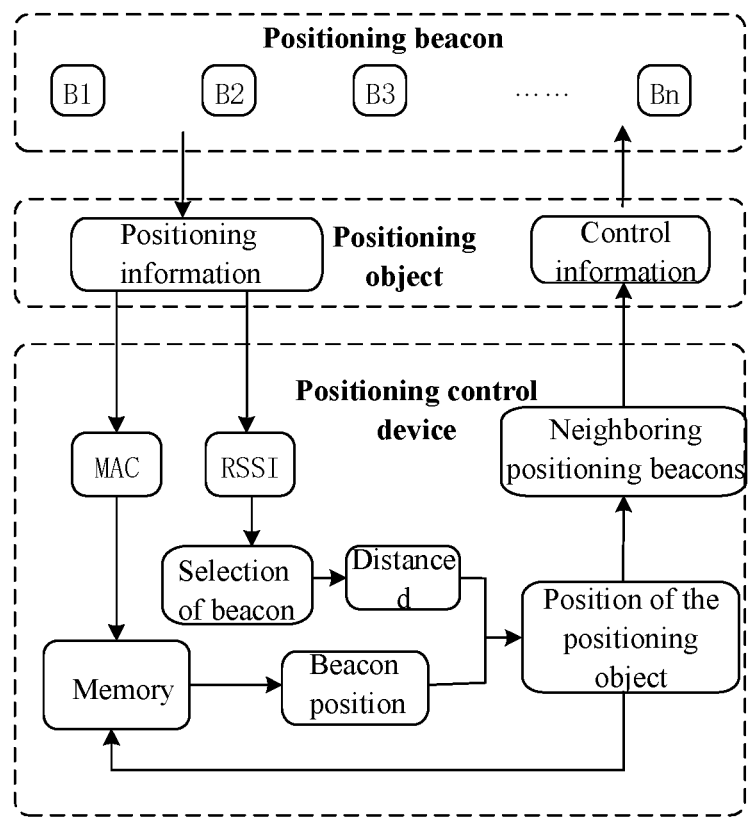
FIG. 8 is a schematic working diagram of a positioning system according to an exemplary embodiment.

First of all, a brief description for operations that the different devices involved in this example need to perform in the positioning control method is given in conjunction with FIG. 8. Positioning beacon may be configured to transmit a broadcast message (for example, the broadcast message may include a unique identifier of the positioning beacon) and a prompt message for indicating that a positioning object is detected. The positioning beacon may be a Bluetooth beacon with low power consumption. For example, a module configured to acquire a signal strength of the positioning beacon may be installed on the positioning object. This module may be a Bluetooth chip capable of acquiring a beacon RSSI value. The gateway (not shown in FIG. 8) may be configured to receive positioning information uploaded by the positioning object, such as information of the positioning beacon in the foregoing embodiment, and meanwhile convey control information issued by the positioning control device, such as the prompt message in the foregoing embodiment, wherein the positioning information includes: signal strength information (such as the RSSI value of the positioning beacon) and a unique identification code of the corresponding positioning beacon (such as a MAC address of the positioning beacon). The positioning control device may be configured to calculate the position of the positioning object based on the information of the positioning beacon uploaded by the positioning object. For example, the position of the positioning beacon may be determined based on the acquired unique identification code of the positioning beacon. The beacon selection process of the foregoing embodiment may be performed, and a distance d between the selected positioning beacon (that is, the foregoing candidate positioning information) and the positioning object may be calculated. The position of the positioning object can be determined based on the determined positions of the positioning beacon and the distance d between the selected positioning beacon and the positioning object.

The positioning control device may also control the positioning beacon that is closest to the positioning object to send a prompt message to surrounding positioning beacons (the prompt message may indicate that the positioning object is detected), such that other surrounding positioning beacons may adjust their broadcast frequencies based on the received prompt message. The positioning beacon that is closest to the positioning object and other surrounding positioning beacons are all determined as neighboring positioning beacons shown in FIG. 8. The positioning control device in FIG. 8 may be deployed on a back-end server, such as a server, or on the positioning object.

In this example, the positioning control method may include the following processes. Positioning beacons send broadcast messages at a low frequency F1 when the positioning object is not detected in the positioning system, wherein the broadcast message may contain a unique identification code of the positioning beacon, such as a MAC address or the like. When the positioning object enters or needs to be positioned in the positioning system, the positioning object scans broadcast messages of positioning beacons around the positioning object to acquire signal strength information of the positioning beacons, such as RSSI and MAC addresses of the positioning beacons, and uploads the information of the positioning beacons via a gateway or directly to the positioning control device, wherein the uploaded information may be stored in a memory of the positioning control device. The positioning control device performs a three-point positioning algorithm based on the received information uploaded by the positioning object to acquire a position of the positioning object. The positioning control device determines B1 that is closest to the positioning object and other beacons around B1 based on the position of the positioning object. Alternatively, the positioning control device predicts, based on a movement trajectory of the positioning object, other beacons (B2 to B8), and transmits the prompt message that the positioning object is detected to B1 by means of the positioning object, B1 then broadcasts the prompt message to other beacons (B2 to B8) nearby, and the beacons (B1 to B8) that receive the prompt message can switch their broadcast frequencies from F1 to F2 (F2>F1).

In summary, according to the positioning control method in the embodiment of the present disclosure, in response to detecting the positioning object, the prompt message is sent to the target positioning beacon whose positioning distance to the positioning object satisfies the predetermined condition, such that the target positioning beacon increases its broadcast frequency, thereby shortening the positioning response time and improving the positioning response efficiency. However, before the positioning object is detected (that is, before the frequency switching is performed), a relatively low broadcast frequency may be used, which can reduce the power consumption of the positioning beacon during the positioning process and prolong the life cycle of the positioning beacon. In this way, the power consumption of the entire positioning system can be reduced, and the life cycle of the positioning beacon in the positioning system can be prolonged. Further, according to the positioning control method according to the embodiment of the present disclosure, the power consumption of the positioning beacon may be saved without adding any additional hardware (such as a charging device) to the positioning beacon, thereby reducing the manufacturing cost and the use cost of the positioning beacon.

An embodiment of the present disclosure provides a positioning control device. The positioning device includes a memory, a processor, and a computer program stored in the memory and runnable on the processor, wherein the processor, when running the computer program, is caused to perform the following processes:

determining a position of a positioning object; determining, based on the position of the positioning object, at least one target positioning beacon whose distance to the positioning object satisfies a predetermined condition; and sending a prompt message to the target positioning beacon, wherein the prompt message is intended to instruct a positioning beacon to switch a broadcast frequency from a first frequency to a second frequency which is greater than the first frequency.

Optionally, determining, based on the position of the positioning object, the at least one target positioning beacon whose distance to the positioning object satisfies the predetermined condition includes: predicting, based on a movement trajectory of the positioning object acquired in advance, the at least one target positioning beacon whose distance to the positioning object satisfies the predetermined condition; or determining at least one positioning beacon whose distance to a closest positioning beacon is less than a threshold as the at least one target positioning beacon, wherein the closest positioning beacon is determined to be closest to the positioning object based on the position of the positioning object.

Optionally, the processes further include: generating the movement trajectory of the positioning object based on at least one history position of the positioning object acquired within a first predetermined time period.

Optionally, sending the prompt message to the target positioning beacon includes: instructing the positioning object to send the prompt message to the target positioning beacon.

Optionally, the processes further include: sending a control message to the positioning object, wherein the control message is intended to instruct the positioning object to shorten a duration of scanning a broadcast message sent by the positioning beacon.

Optionally, determining the position of the positioning object includes: determining the position of the positioning object based on information of at least one positioning beacon detected by the positioning object.

Optionally, the information of the at least one positioning beacon includes at least one unique identification code of the at least one positioning beacon, and the memory stores a corresponding relationship between the unique identification code and position coordinates of the positioning beacon. Determining the position of the positioning object based on the information of the at least one positioning beacon detected by the positioning object includes: acquiring position coordinates of at least three positioning beacons from the memory based on the unique identification codes of the at least three positioning beacons detected by the positioning object; and determining the position of the positioning object using a three-point positioning algorithm based on the position coordinates of the at least three positioning beacons.

An embodiment of the present disclosure provides a positioning control device. The positioning control device includes a memory, a processor, and a computer program stored in the memory and runnable on the processor. The processor, when running the computer program, is caused to perform the following processes: sending a broadcast message at a first frequency; acquiring a prompt message, wherein the prompt message is intended to instruct a positioning beacon to switch a broadcast frequency from the first frequency to a second frequency, and the prompt message is generated in response to detecting the positioning object; switching the broadcast frequency from the first frequency to the second frequency based on the prompt message; and sending the broadcast message at the second frequency which is greater than the first frequency.

Optionally, acquiring the prompt message includes: acquiring the prompt message from the positioning object, or acquiring the prompt message broadcast by a target positioning beacon, wherein a distance between the target positioning beacon and the positioning object satisfies a predetermined condition.

Optionally, the processes further include: in response to switching the broadcast frequency from the first frequency to the second frequency, switching the broadcast frequency from the second frequency to the first frequency if an instruction message to change the broadcast frequency is not received within a second predetermined time period.

Figure 9:
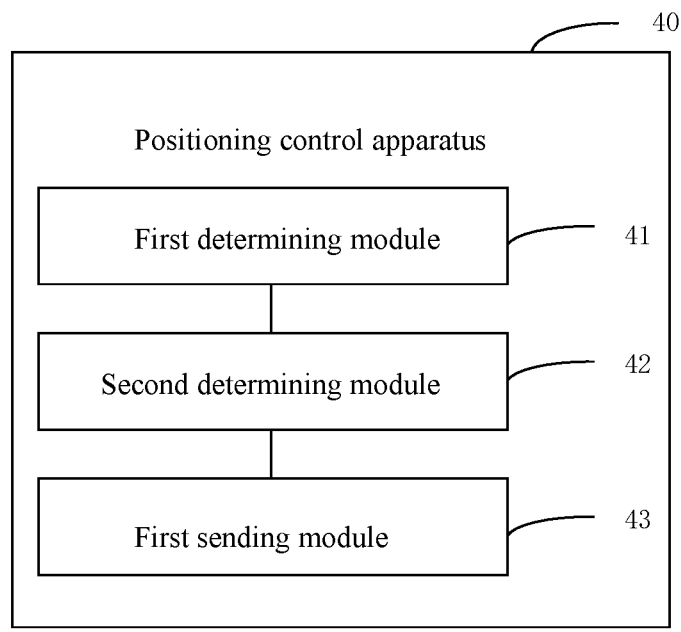
FIG. 9 is a block diagram of a positioning control apparatus according to an exemplary embodiment.

FIG. 9 is a block diagram of a positioning control apparatus according to an exemplary embodiment. As shown in FIG. 9, the apparatus 40 includes a first determining module 41 configured to determine a position of a positioning object; a second determining module 42 configured to determine, based on the position of the positioning object, at least one target positioning beacon whose distance to the positioning object satisfies a predetermined condition; and a first sending module 43 configured to send a prompt message to the target positioning beacon, wherein the prompt message is intended to instruct a positioning beacon to switch a broadcast frequency from a first frequency to a second frequency which is greater than the first frequency.

In some embodiments, the second determining module 42 is configured to predict, based on a movement trajectory of the positioning object acquired in advance, the at least one target positioning beacon whose distance to the positioning object satisfies the predetermined condition.

In some embodiments, the second determining module 42 is configured to determine at least one positioning beacon whose distance to a closest positioning beacon is less than a threshold as the at least one target positioning beacon, wherein the closest positioning beacon is determined to be closest to the positioning object based on the position of the positioning object.

Figure 10:
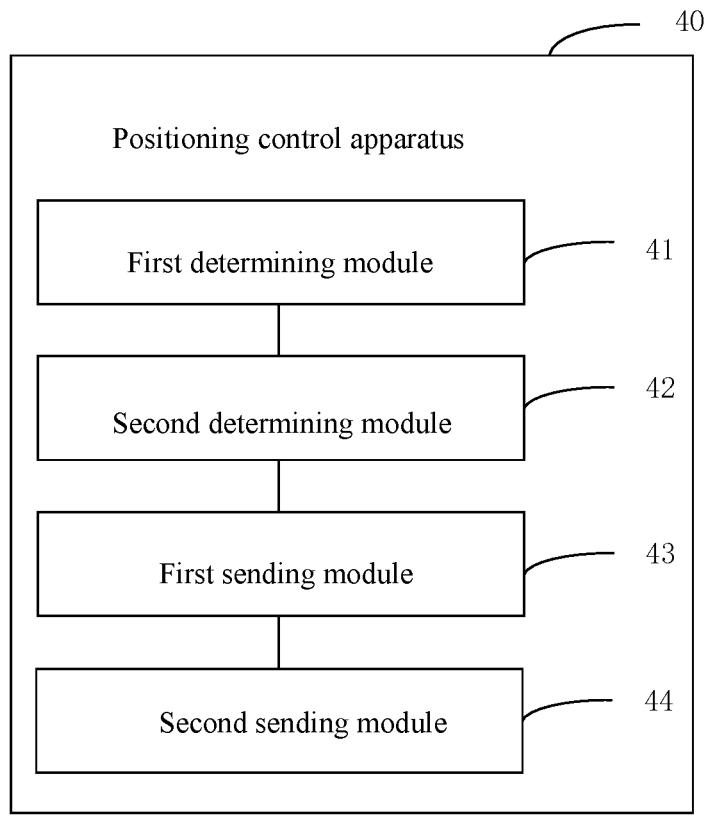
FIG. 10 is a block diagram of a positioning control apparatus according to an exemplary embodiment.

In some embodiments, as shown in FIG. 10, the apparatus 40 further includes a second sending module 44 configured to send a control message to the positioning object, wherein the control message is intended to instruct the positioning object to shorten a duration of scanning a broadcast message sent by the positioning beacon.

In some embodiments, the apparatus further includes a trajectory generating module configured to generate a movement trajectory of the positioning object based on a t least one history position of the positioning object acquired within a first predetermined time period.

In some embodiments, the first sending module 43 is configured to instruct the positioning object to send the prompt message to the target positioning beacon.

In some embodiments, the first determining module 41 is configured to determine the position of the positioning object based on information of at least one positioning beacon detected by the positioning object.

In some embodiments, the first determining module 41 is configured to determine the position of the positioning object using a three-point positioning algorithm based on the information of at least three positioning beacons detected by the positioning object.

Optionally, the information of the at least one positioning beacon includes a unique identification code of at least one positioning beacon. The first determining module 41 is configured to acquire position coordinates of at least three positioning beacons based on the unique identification codes of the at least three positioning beacons detected by the positioning object by querying a corresponding relationship between the unique identification code and position coordinates of each of the positioning beacons; and determine the position of the positioning object using a three-point positioning algorithm based on the position coordinates of the at least three positioning beacons.

Figure 11:
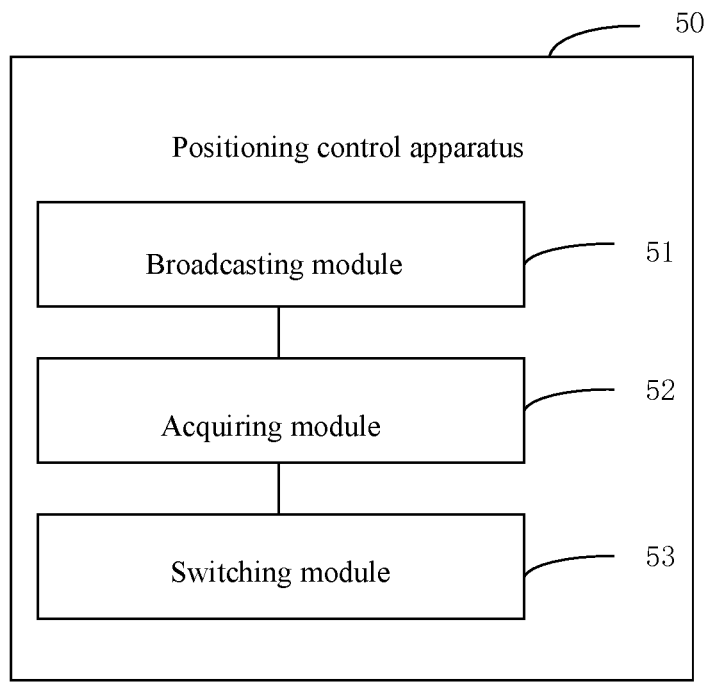
FIG. 11 is a block diagram of a positioning control apparatus according to an exemplary embodiment.

FIG. 11 is a block diagram of a positioning control apparatus according to an exemplary embodiment. As shown in FIG. 11, the apparatus 51 includes:

a broadcasting module 51 configured to send a broadcast message at a first frequency; an acquiring module 52 configured to acquire a prompt message, wherein the prompt message is intended to instruct a positioning beacon to switch a broadcast frequency from the first frequency to a second frequency, and the prompt message is generated in response to detecting the positioning object; and a switching module 53 configured to switch the broadcast frequency from the first frequency to the second frequency based on the prompt message. The broadcasting module 51 is configured to send the broadcast message at the second frequency which is greater than the first frequency.

In some embodiments, the acquiring module 52 is configured to acquire the prompt message from the positioning object, or acquire the prompt message broadcast by at least one target positioning beacon, wherein a distance between the at least one target positioning beacon and the positioning object satisfies a predetermined condition.

In some embodiments, the switching module 53 is further configured to: in response to switching the broadcast frequency from the first frequency to the second frequency, switch the broadcast frequency from the second frequency to the first frequency if an instruction message to change the broadcast frequency is not received within a second predetermined time period.

An embodiment of the present disclosure further provides an electronic device. The electronic device includes a memory, a processor, and a computer program stored in the memory and runnable on the processor, wherein the processor, when running the program, is caused to perform any of the above positioning control methods.

An embodiment of the present application further provides a non-transitory computer-readable storage medium, storing at least one computer instruction therein, wherein the at least one computer instruction, when executed by a computer, causes the computer to perform any of the above positioning control methods.

Figure 12:
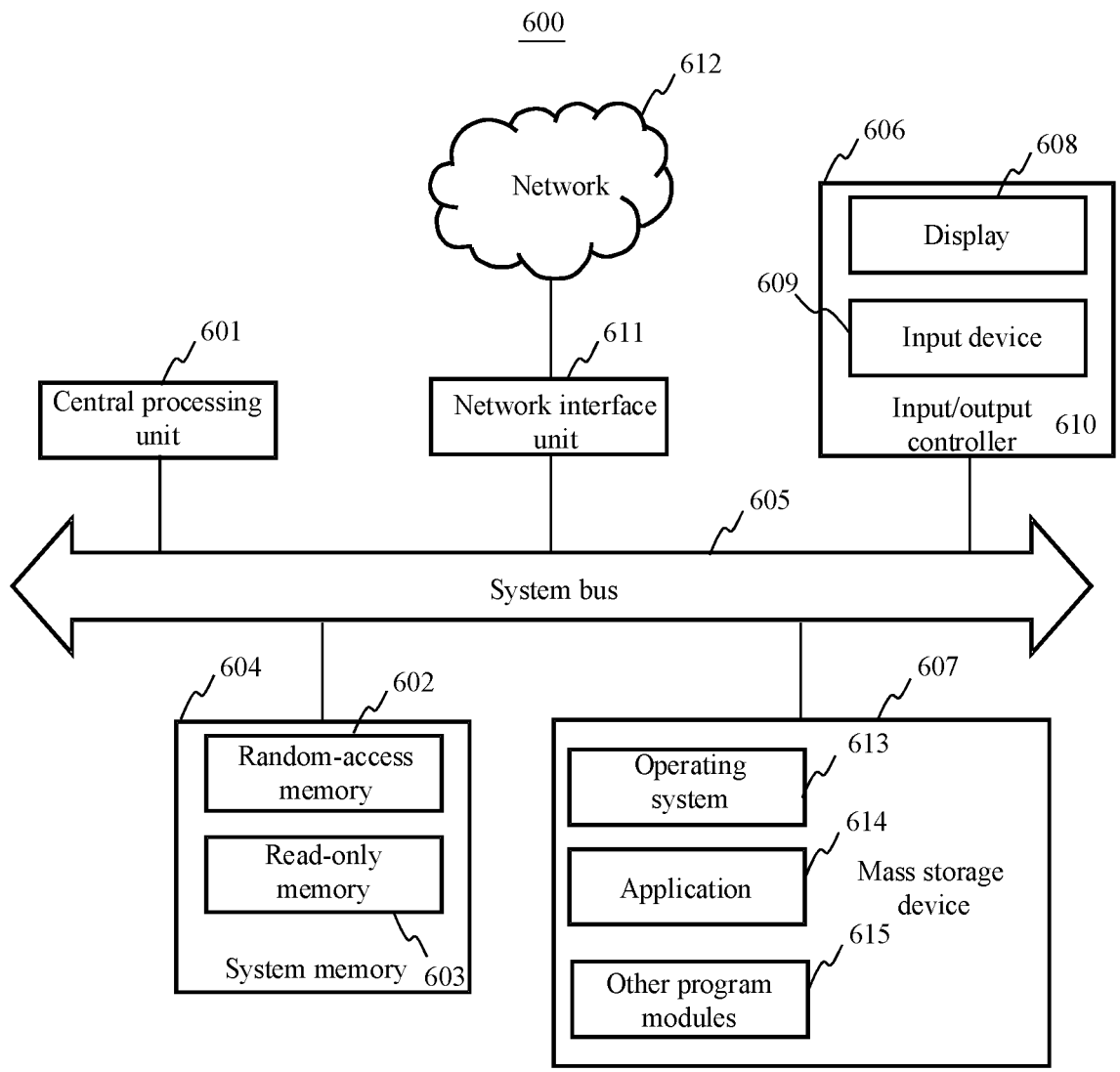
FIG. 12 is a schematic structural diagram of a positioning control device according to an exemplary embodiment.

FIG. 12 is a schematic structural diagram of a positioning control device according to an exemplary embodiment. In an exemplary embodiment, the positioning control device is the aforementioned positioning control device, for example, one or more servers. The positioning control device 600 includes a central processing unit (CPU) 601, a system memory 604 including a random-access memory (RAM) 602 and a read-only memory (ROM) 603, and a system bus 605 that connects the system memory 604 and the central processing unit 601. The positioning control device 600 further includes a basic input/output system (I/O system) 606 facilitating information transfer between respective devices within the computer, and a mass storage device 607 configured to store an operating system 613, an application 614, and other program modules 615.

The basic input/output system 606 includes a display 608 configured to display information, and an input device 609, such as a mouse or keyboard, for a user to input information. The display 608 and the input device 609 are both connected to the CPU 601 via an input/output controller 610 that is connected to the system bus 605. The basic I/O system 606 may further include an input/output controller 610 configured to receive and process the input from a plurality of other devices, such as a keyboard, mouse, or electronic stylus. Similarly, the input/output controller 610 further provides output to a display screen, a printer, or other types of output devices.

The mass storage device 607 is connected to the CPU 601 by a mass storage controller (not shown) connected to the system bus 605. The mass storage device 607 and the related computer readable mediums provide non-volatile storage for the positioning control device 600. That is, the mass storage device 607 may include a computer readable medium (not shown), such as, a hard disk or a CD-ROM drive.

Without loss of generality, the computer readable medium may include a computer storage medium and a communication medium. The computer storage medium includes volatile and nonvolatile, removable, and non-removable mediums implemented by any method or technology for storing the information, such as, computer readable instructions, data structures, program modules or other data. The computer storage medium includes RAM, ROM, EPROM, EEPROM, flash memory or other solid state storage devices, CD-ROM, DVD or other optical storage, tape cartridges, magnetic tape, magnetic disk storage or other magnetic storage devices. A person skilled in the art will appreciate that the computer storage medium is not limited to the above ones. The aforesaid system memory 604 and mass storage device 607 may be collectively referred to as a memory.

According to various embodiments of the present disclosure, the positioning control device 600 may further be operated by a remote computer connected to a network by the network such as the Internet. That is, the positioning control device 600 may be connected to a network 612 by a network interface unit 611 connected to the system bus 605, or may be connected to other types of networks or remote computer systems (not shown) by the network interface unit 611.

The memory further includes one or more programs, wherein the one or more programs are stored in the memory, and the CPU 601, when running the one or more programs, perform the positioning control method shown in FIG. 4.

An embodiment of the present application provides a positioning system. The positioning system includes a plurality of positioning beacons and a positioning control device, wherein the positioning control device includes one or more positioning control devices according to the embodiments of the present disclosure, such as the positioning control apparatus 40 and/or the positioning control apparatus 50.

The devices in the above embodiments are configured to perform the corresponding methods in the above embodiments, and achieve the beneficial effects of the corresponding method embodiment, which are not repeated herein.

As appreciated by a person skilled in the art, any of the embodiments discussed above is only exemplary and is not intended to imply that the scope of the present disclosure (including the claims) is limited to the examples. Without departing from the concept of the present disclosure, the above embodiments or technical features of different embodiments may be combined, the processes may be performed in an arbitrary order, and there exist many other alterations for the present disclosure in different aspects. For simplicity, these modified embodiments are not described in detail here.

The term "at least one" refers to one or more, and the term "a plurality of" refers to two or more, unless particularly explicitly described otherwise. The expression that "for details about A, reference may be made to B" may be interpreted as that A is the same as B, or A is simply modified based on B. As used herein, the term "if" may be interpreted as "when" or "upon" or "in response to determining" depending on the context.

In addition, for simple explanation and discussion of the present disclosure, well-known power/grounding connection of integrated circuit (IC) chips and other components may be shown or may not be shown in the provided drawings. Moreover, the apparatuses may be illustrated via block diagrams to avoid obscuring the present disclosure. Moreover, real circumstances are also taken into consideration. That is, the details of the embodiments of these apparatuses shown as the block diagrams are highly dependent on a platform for implementing the present disclosure, which indicates that these details should be totally in an understandable scope of a person skilled in the art. Under the condition that the specific details (e.g., circuits) are elaborated to describe the exemplary embodiments of the present disclosure, it is apparent for a person skilled in the art that the present disclosure may be implemented if no specific detail is given or the specific details have changed. Therefore, the descriptions should be considered as illustrative but not restrictive.

Although the present disclosure is described by accompanying the specific embodiments, based on the forgoing descriptions, lots of alternatives, modifications and variations of the embodiments will be apparent for a person of ordinary skill in the art. For example, other memory architectures, e.g., a dynamic RAM (DRAM), may be used in the discussed embodiments.

The embodiments of the present disclosure are intended to embrace all such alternatives, modifications and variations that fall within the wide scope of the appended claims. Thus, any omission, modification, equivalent replacement, improvement and the like made within the spirit and principle of the present disclosure shall be encompassed by the protection scope of the present disclosure.

What is claimed is:

1. A positioning control device, comprising a memory, a processor, and a computer program stored in the memory and runnable on the processor, wherein the processor, when running the computer program, is caused to perform following processes:

determining a position of a positioning object;

determining, based on the position of the positioning object, at least one target positioning beacon whose distance to the positioning object satisfies a predetermined condition; and sending a prompt message to the target positioning beacon, wherein the prompt message is intended to instruct a positioning beacon to switch a broadcast frequency from a first frequency to a second frequency which is greater than the first frequency, the processes further comprise:

sending a control message to the positioning object, wherein the control message is intended to instruct the positioning object to shorten a duration of scanning a broadcast message sent by the positioning beacon.

2. The device according to claim 1, wherein determining, based on the position of the positioning object, the at least one target positioning beacon whose distance to the positioning object satisfies the predetermined condition comprises:

predicting, based on a movement trajectory of the positioning object acquired in advance, the at least one target positioning beacon whose distance to the positioning object satisfies the predetermined condition; or determining at least one positioning beacon whose distance to a closest positioning beacon is less than a threshold as the at least one target positioning beacon, wherein the closest positioning beacon is determined to be closest to the positioning object based on the position of the positioning object.

3. The device according to claim 2, wherein the processes further comprise: generating the movement trajectory of the positioning object based on at least one history position of the positioning object acquired within a first predetermined time period.

4. The device according to claim 1, wherein sending the prompt message to the target positioning beacon comprises: instructing the positioning object to send the prompt message to the target positioning beacon.

5. The device according to claim 1, wherein determining the position of the positioning object comprises: determining the position of the positioning object based on information of at least one positioning beacon detected by the positioning object.

6. The device according to claim 5, wherein the information of the at least one positioning beacon comprises at least one unique identification code of the at least one positioning beacon, and the memory stores a corresponding relationship between the unique identification code and position coordinates of the positioning beacon therein; and determining the position of the positioning object based on the information of the at least one positioning beacon detected by the positioning object comprises:
acquiring position coordinates of at least three positioning beacons from the memory based on the unique identification codes of the at least three positioning beacons detected by the positioning object; and
determining the position of the positioning object using a three-point positioning algorithm based on the position coordinates of the at least three positioning beacons.

7. A positioning control method, performed by the positioning control device according to claim 1, the method comprising:
determining a position of a positioning object;
determining, based on the position of the positioning object, at least one target positioning beacon whose distance to the positioning object satisfies a predetermined condition; and
sending a prompt message to the target positioning beacon, wherein the prompt message is intended to instruct a positioning beacon to switch a broadcast frequency from a first frequency to a second frequency which is greater than the first frequency.

8. The method according to claim 7, wherein determining, based on the position of the positioning object, the at least one target positioning beacon whose distance to the positioning object satisfies the predetermined condition comprises:
predicting, based on a movement trajectory of the positioning object acquired in advance, the at least one target positioning beacon whose distance to the positioning object satisfies the predetermined condition; or
determining at least one positioning beacon whose distance to a closest positioning beacon is less than a threshold as the at least one target positioning beacon, wherein the closest positioning beacon is determined to be closest to the positioning object based on the position of the positioning object.

9. The method according to claim 7, wherein sending the prompt message to the target positioning beacon comprises: instructing the positioning object to send the prompt message to the target positioning beacon.

10. The method according to claim 7, further comprising: sending a control message to the positioning object, wherein the control message is intended to instruct the positioning object to shorten a duration of scanning a broadcast message sent by the positioning beacon.

11. The method according to claim 7, wherein determining the position of the positioning object comprises: determining the position of the positioning object based on information of at least one positioning beacon detected by the positioning object.

12. A positioning control method, performed by the positioning control device as defined in claim 1, the method comprising:
sending a broadcast message at a first frequency;
acquiring a prompt message, wherein the prompt message is intended to instruct a positioning beacon to switch a broadcast frequency from the first frequency to a second frequency, and the prompt message is generated in response to detecting the positioning object;
switching the broadcast frequency from the first frequency to the second frequency based on the prompt message; and
sending the broadcast message at the second frequency which is greater than the first frequency.

13. The method according to claim 12, wherein acquiring the prompt message comprises: acquiring the prompt message from the positioning object, or acquiring the prompt message broadcast by at least one target positioning beacon, wherein a distance between the at least one target positioning beacon and the positioning object satisfies a predetermined condition.

14. The method according to claim 12, further comprising: in response to switching the broadcast frequency from the first frequency to the second frequency, switching the broadcast frequency from the second frequency to the first frequency if an instruction message to change the broadcast frequency is not received within a second predetermined time period.

15. A non-transitory computer-readable storage medium storing at least one computer instruction therein, wherein the at least one computer instruction, when executed by a computer, causes the computer to perform the positioning control method as defined in claim 11.

16. A positioning system, comprising a plurality of positioning beacons and a positioning control device, wherein the positioning control device and the positioning beacons satisfy at least one of the following conditions:
the positioning control device comprises a memory, a processor, and a computer program stored in the memory and runnable on the processor, wherein the processor, when running the computer program, is caused to perform following processes:
determining a position of a positioning object;
determining, based on the position of the positioning object, at least one target positioning beacon whose distance to the positioning object satisfies a predetermined condition; and
sending a prompt message to the target positioning beacon, wherein the prompt message is intended to instruct a positioning beacon to switch a broadcast frequency from a first frequency to a second frequency which is greater than the first frequency,
the processes further comprise:
sending a control message to the positioning object, wherein the control message is intended to instruct the positioning object to shorten a duration of scanning a broadcast message sent by the positioning beacon, and the positioning beacons comprise a memory, a processor, and a computer program stored in the memory and runnable on the processor, wherein the processor, when running the computer program, is caused to perform the following processes:

sending a broadcast message at a first frequency;

acquiring a prompt message, wherein the prompt message is intended to instruct a positioning beacon to switch a broadcast frequency from the first frequency to a second frequency, and the prompt message is generated in response to detecting the positioning object;

switching the broadcast frequency from the first frequency to the second frequency based on the prompt message; and sending the broadcast message at the second frequency which is greater than the first frequency.

* * * * *